United States Patent
Pycock

(10) Patent No.: US 10,002,260 B2
(45) Date of Patent: Jun. 19, 2018

(54) SHARING CONTENT

(71) Applicant: Microsoft Technology Licensing, LLC, Redmond, WA (US)

(72) Inventor: James E. Pycock, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/538,680

(22) Filed: Nov. 11, 2014

(65) Prior Publication Data

US 2016/0063276 A1    Mar. 3, 2016

(30) Foreign Application Priority Data

Aug. 29, 2014 (GB) .................................. 1415357.1

(51) Int. Cl.
| | |
|---|---|
| *G06F 21/62* | (2013.01) |
| *H04L 29/06* | (2006.01) |
| *H04W 12/02* | (2009.01) |
| *H04L 12/18* | (2006.01) |
| *H04L 12/58* | (2006.01) |

(52) U.S. Cl.
CPC ...... *G06F 21/6245* (2013.01); *H04L 12/1822* (2013.01); *H04L 51/046* (2013.01); *H04L 63/04* (2013.01); *H04L 63/102* (2013.01); *H04W 12/02* (2013.01); *H04L 51/10* (2013.01); *H04L 51/12* (2013.01)

(58) Field of Classification Search
CPC ..... G06F 21/6245; H04L 51/12; H04L 63/04; H04L 63/102
See application file for complete search history.

(56) References Cited

U.S. PATENT DOCUMENTS

| | | |
|---|---|---|
| 6,253,217 B1 * | 6/2001 | Dourish ............ G06F 17/30011 707/E17.008 |
| 8,103,947 B2 | 1/2012 | Lunt et al. |
| 8,392,957 B2 | 3/2013 | Holt et al. |

(Continued)

FOREIGN PATENT DOCUMENTS

WO    WO-2011094028    8/2011

OTHER PUBLICATIONS

Adobe (Adobe® Livecycle® Designer 11 Help, Dec. 4, 2013, 713 pages).*

(Continued)

*Primary Examiner* — Oleg Korsak
(74) *Attorney, Agent, or Firm* — Schwegman Lundberg & Woesnner, P.A.

(57) ABSTRACT

A method performed in relation to a private conversation conducted over a network between a selected group of two or more users, each of the group of users participating in the conversation from a respective instance of a communication client application run on a respective user device. The private conversation comprises one or more content items, each of these content items being shared by a respective source user of the group with one or more other users of the group internally within the private conversation. The method comprises associating a respective permissions model with each respective one of the content items, the permission model being configured to act on the client application to control permission for the one or more other users to use the respective content item outside of said conversation.

19 Claims, 3 Drawing Sheets

(56) References Cited

U.S. PATENT DOCUMENTS

| 8,640,257 | B1 | 1/2014 | Sherrets et al. | |
|---|---|---|---|---|
| 2008/0037725 | A1* | 2/2008 | Berstis | H04L 65/1073 379/88.13 |
| 2009/0150397 | A1 | 6/2009 | Chen et al. | |
| 2010/0042690 | A1* | 2/2010 | Wall | H04L 51/046 709/206 |
| 2010/0242091 | A1 | 9/2010 | Xu et al. | |
| 2012/0072971 | A1 | 3/2012 | Zhang et al. | |
| 2013/0042305 | A1 | 2/2013 | Svendsen et al. | |
| 2013/0091026 | A1* | 4/2013 | Deng | G06Q 30/02 705/14.73 |
| 2013/0173408 | A1 | 7/2013 | Lindblom | |

OTHER PUBLICATIONS

"International Search Report and Written Opinion", Application No. PCT/US2015/046835, Nov. 13, 2015, 10 pages.

"Requesting Permission", Retrieved From: <https://help.attask.com/01AtTask_Help/Help_For_Admins/Access_Model/Permissions_in_the_Access_Model/Requesting_Permission> Jul. 16, 2014, 3 pages.

Kiss, "Facebook Changes How Photos Are Tagged and Shared", Retrieved From: <http://www.theguardian.com/technology/2011/aug/23/facebook-photos-tagged-shared> Jul. 16, 2014, Aug. 23, 2011, 3 pages.

"International Preliminary Report on Patentability Issued in PCT Application No. PCT/US2015/046835", dated Jul. 21, 2016, 5 pages.

\* cited by examiner

SHARING CONTENT

RELATED APPLICATIONS

This application claims priority under 35 USC § 119 or § 365 to Great Britain Patent Application No. 1415357.1, filed Aug. 29, 2014, the disclosure of which is incorporate in its entirety.

BACKGROUND

Various communication services exist which enable users to establish private conversations between them, over a network such as the Internet. Examples include IM (instant messaging) chat services, VoIP (Voice over Internet Protocol) services, picture messaging services, video messaging services and/or voice messaging services. In an IM chat conversation for example, a user can send a textual message to the one or more other users involved in the conversation. In a VoIP conversation (a call), a user can stream live voice and/or video to the other users in the conversation. In a picture messaging conversation, a user can send a still image to the other users in the conversation, while in a video messaging conversation a user can send a video clip, and in a voice messaging conversation a user can leave a (non-live) voice clip.

To be able to participate in such conversations, each of multiple users installs a respective instance of a communication client application on his or her respective user device (e.g. smartphone, tablet, or laptop or desktop computer). The communication client application may be implemented in any suitable executable or interpreted code, whether in the form of a stand-alone application running on an operating system, or a plug-in application to another application, or an applet running in a browser (e.g. purely in script, or using an API such as WebRTC). A communication client provided by a given communication service provider (potentially including different compatible releases of the application) defines a given communication service, with different service providers producing different applications and therefore providing separate services. For example, the IM application produced by a first service provider would provide a first IM service, while a second IM application produced by a second service provider would provide a second IM service; or the VoIP application produced by a first service provider would provide a first VoIP service, while a second VoIP application produced by a second service provider would provide a second VoIP service; and similarly for picture messaging or video messaging applications, etc. Note also that different conversation media can optionally be combined into the service provided by a given service provider, e.g. the application provided by a first service provider my enable a combination of IM chat messages, voice calling, video calling, picture messaging, video messaging and/or voice messaging to be included in the same conversation.

Typically the different services are characterised by different systems of usernames. For example, a given user is identified within the first communication service (for the purpose of being contacted by other users of the first service) by a first username that is unique amongst the usernames of the first service but not necessarily the second service, and is identified within the second service (for the purpose of being contacted by other users of the second service) by a second username that is unique within the second communication service but not necessarily the first service.

Private conversations are distinct from other, more public forms of communication such as social media feeds, in that a conversation is an exchange of communications between only a selected group of users who have been selected to take part in the conversation, with the exchange (i.e. both sent and received messages) being self-contained within that group. E.g. by contrast in a social media environment, it may be the case that the messages posted by any given user are only distributed to selected contacts, but the receiving user's feed will also collect together messages from other user's feeds, and those messages are not necessarily contained within the same group of users. Further, while the messages posted by any given user may only be distributed to the feeds of selected contacts, other messages posted by those contacts are in general distributed to the feeds of different sets of contacts which are not necessarily coincident, and there is no concept of a discrete conversation. Therefore unlike private conversations, social media feeds are not self-contained but rather span out in a web or mesh of contacts. Conversations also typically are conducted between smaller groups of users, e.g. less than ten users, less than five users or even just two or three users. Furthermore, usually each participant in a conversation knows who each of the other participants are, and the participants list may be displayed in the presentation of the conversation. Messages sent within a conversation are therefore directed towards specific and known participants and not accessible outside of that group or outside of the conversational context.

Communication systems that support conversations may also store unique identifiers for conversations. For example, each conversation may have its own ID and records of who the participants are, when the conversation was created and sometimes if there is an administrator with special permissions to add or delete participants to a conversation and change the name of the conversation.

Conversations allow items of content to be shared within the conversation, and nowadays may include multimedia content items such as still images, video images and/or audio clips. For example, a picture messaging application allows users to share still images amongst one another, or an IM application may allow a user to insert a picture or video into the conversation to be shared with the other users (e.g. by dragging and dropping the image into the a conversation window of the application).

In some applications, there is no restriction on the use of the shared content at the receive side. This means that any receiving user is free to save the content or share the content outside of the conversation, e.g. to share into a different conversation with different users, or even to share into a different communication service such as a social media site.

On the other hand, as a conversation may be between a small closed group of close contacts, there can be user expectations that content shared in the private conversation remains private within the conversation.

More recently, to address this concern, communication applications have been produced which "sandbox" the content they receive as part of a particular conversation. This means that any receiving user of a conversation can only view (or play out) the content through the particular client application through which that conversation was conducted, within the context of that conversation, and is blocked from saving the content or sharing it onwards to any other conversations or any other communications services—i.e. confining the content to the particular service and conversation through which it was initially shared by the source user. For example, in a sandboxed picture messaging service, a picture is only viewable through the corresponding picture messaging application through which it was received, and only in the context of the same conversation.

Short of a screen capture or photographing the screen, the receiving user cannot save the image or move it in any other way outside of the conversation and application in question.

SUMMARY

However, it is believed this approach may be unduly restrictive. Rather than either providing no restriction over content or completely sandboxing content, it would be desirable to allow users to control whether and/or how content they have shared into a conversation can be used outside the conversation, e.g. whether such content can be shared onwards into other conversations and/or to other, third-party services. Furthermore, users may desire to exercise this control at the level of individual content items within a conversation and not only at the level of the overall conversation.

According to one aspect disclosed herein, there is provided a method for controlling permissions in relation to a private conversation (e.g. IM chat conversation, VoIP call or picture messaging conversation) conducted over a network between a selected group of two or more users. Each of said group of users participates in the conversation from a respective instance of a communication client (e.g. IM, VoIPor picture messaging application) run on a respective user device (e.g. smartphone, tablet, or laptop or desktop computer). The private conversation comprises one or more content items (e.g. text message, still image, video image or audio clip), each of said content items being shared by a respective source user of said group with one or more other users of said group. When shared by the source user, the content item is just shared internally within the private conversation. However, one or more of the other users may wish to use the content item outside the conversation, e.g. to share the content item onwards into another conversation conducted using the same client application (potentially involving different users), or to another, third-party communication service such as a social media service. To deal with this without compromising the source user's privacy, the method comprises associating a respective permissions model with each respective one of the content items. The permission model may be attached to the content item by the client of the source user, or by an intermediary server, and in embodiments is attached automatically. Either way, the permission model is configured to act on the communication client (at the devices of the other users) to control permission for the one or more other users to use the respective content item outside of said conversation, e.g. to control permission for the one or more other users to make the respective content item available outside of said conversation.

Thus content shared in a conversation thus acquires a rights model or "permission model" which controls (e.g. blocks, grants or inhibits the extent of) the use and/or onwards distribution of the content beyond the conversation. Whether the content is blocked or inhibited is not just a fixed, intrinsic property of the communication client (and therefore the service provided by that client), but rather can be controlled on a per-item basis by a small, settable data structure tagged on to each item of content.

In embodiments, the permission model may control the permission individually for each of a plurality of the other users of the group, thus specifying which of the other users can share the content item onwards, and/or in what manner each of the other users is permitted to share the item.

By way of example, the permission model may control: (a) whether or not the respective content item is permitted to be shared onwards with one or more third-party users who are not users of said group and so not party to the private conversation, and/or which third-party users the respective content item is permitted to be shared with; (b) whether or not the respective content item is permitted to be shared outside the communication client application (i.e. outside the communication service provided by that application), and/or which other communication services (e.g. social media services) the respective content item is permitted to be shared with; (c) whether or not the respective content item is permitted to be shared into one or more other conversations conducted using said communication client application, and/or which other conversations the respective content item is permitted to be shared with; (d) whether or not the respective content item is permitted to be saved to non-volatile storage; and/or (e) whether or not the respective content item is permitted to be modified outside the conversation, and/or in what manner it is permitted to be modified outside the conversation.

In embodiments, the permission may be selectably granted by the source user in response to a request from a requesting one of the other users. For instance, a permission messaging mechanism may be incorporated into the communication client application, enabling a requesting one of the other users to request permission from the respective source user to make one of the content items available outside of the private conversation within which the item was initially shared. On condition of the request being accepted by the source user, the respective permission model is then set to grant the requested permission to the requesting user. E.g. the messaging mechanism may comprise a user interface element, such as a drop down permission menu, which is attached to the content item as presented to the requesting user by the client application on the requesting user's device. When the requesting user actuates this user-interface element, the client application then sends the request to the client application on the source user's device. Further, the messaging mechanism may comprise a user-interface element, such as a pair of buttons, which is presented to the source user by the communication client application on the source user's device upon receipt of the request, and which provides the source user with an option to either accept or decline the request.

Thus in embodiments, content shared in a conversation acquires a permission model which can be modified through message based requests and approvals communicated through the same conversation platform. In such embodiments a communication system may have existing message types (e.g. text message, photo message, video message) and implement one or more additional message types for requesting and for granting permissions for content shared within the conversation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

To assist understanding of the present disclosure and to show how embodiments may be put into effect, reference will be made by way of example to the accompanying drawings in which.

DETAILED DESCRIPTION OF EMBODIMENTS

Figure 1:
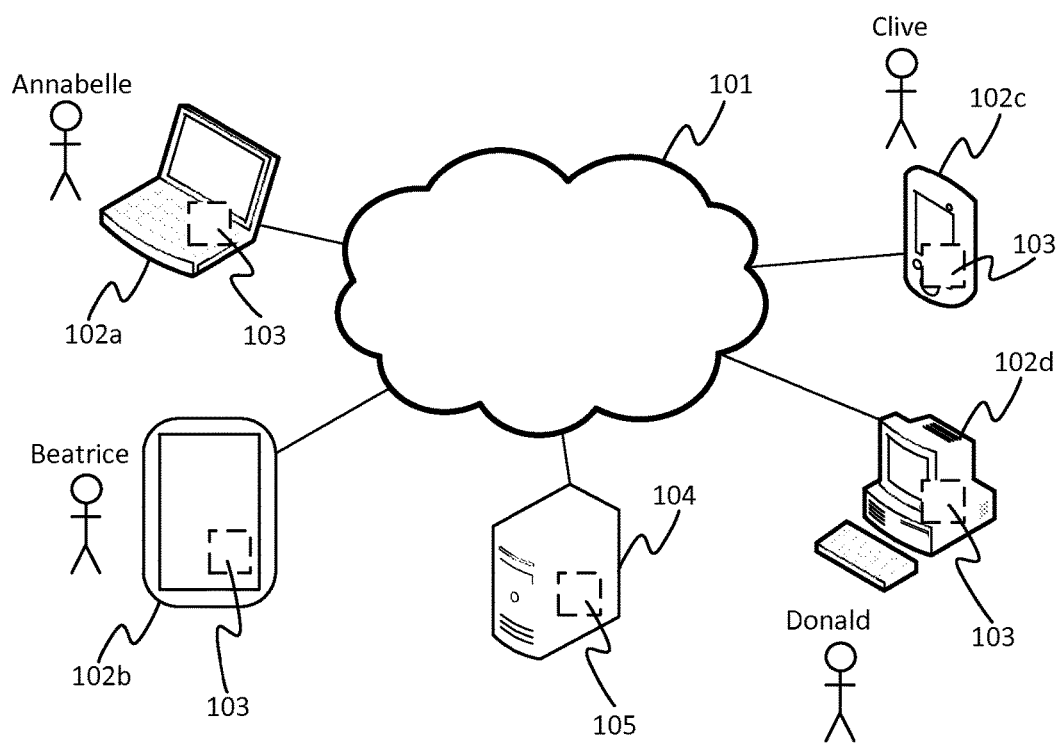
FIG. 1 is a schematic diagram of a communication network.

FIG. 1 illustrates a communication system comprising a network 101, e.g. a public wide area internetwork such as the Internet, or a private wide area network such as a company intranet. Connected to the network 101 is a plurality of user devices in the form of user terminals 102, such as desktop computers, laptop computers, tablets and/or smartphones. Each of the user terminals 102 is installed with a respective instance of a communication client application 103 provided by a particular communication service provider. The client application 103 takes the form of a computer program comprising any form of code embodied on one or more computer-readable storage media (e.g. a magnetic medium such as a hard drive, an electronic medium such as EEPROM of "flash", or an optical medium such as a CDROM); and configured so as, when run (by execution or interpretation) using one or more processors of the respective user terminal 102, to perform operations as discussed herein. The communication client application 103 may take any suitable form such as a stand-alone application for running on an operating system, or a plug-in application to run in conjunction with another application, or an applet or other browser-based application for running in a browser such as a web-browser (e.g. purely in script, or using an API such as WebRTC). In embodiments, the communication client 103 may be an IM application for conducting IM chat conversations over the network 101; a voice and/or video calling client such as a VoIP client for conducting live voice and/or video calls between user terminals 102 over the network 101; and/or a picture, video and/or voice messaging application for sending pictures, video clips and/or audio clips over the network. In FIG. 1, four user terminals 102a, 102b, 102c, 102d of four respective users Annabelle, Beatrice, Clive and Donald are shown for illustrative purposes. However, it will be appreciated that may more such user terminals 102 and their respective users may be present.

The multiple instances of the client application 103 running on the different user terminals 102 act to provide a communication service, with each of the users being identified by a different respective username that is unique amongst all users of the communication service in question. In operation, a first one of the users, e.g. Annabelle, uses the client application 103 running on her user terminal 102a to select the username of one or more of the other users to participate in a conversation, e.g. Beatrice (the username may be selected via a user-friendly interface that maps usernames to actual names). The client 103 on the first user's terminal 102a sends an invitation to the instance of the client 103 on the one or more other users' terminals 102b, which presents the invited user(s) with the option to accept or decline the invitation. Assuming the invited user accepts, then her client application 103 returns an acceptance to the instance of the client 103 on the first user's terminal 102a. A conversation is thus established between (and only between) the instances of the client 103 on the selected users' terminals 102a, 102b. The conversation is identified by a conversation ID, which is unique at least amongst the IDs of any other conversations currently ongoing within the communication service in question.

When a conversation is established, the client application 103 is configured to present each user with at least a region of the client's user interface dedicated to the conversation, e.g. a conversation window, through which he or she can input outgoing content items and view received content items as part of that conversation. When a user (the "source" user) inputs a content item (e.g. a picture of him or herself) through the conversation user interface of the communication client 103 at the respective user terminal 102a at the transmit side, the client 103 then sends that content item over the network 101 to the instance on the client 103 on the user terminal(s) 102b of the one or more other, receiving participants of the conversation. The receiving instance 103 then presents the content item (e.g. picture) to the receiving user through the user interface region (e.g. conversation window) dedicated to the conversation at the receive side, being presented as part of a coherent thread of conversation in context of one or more preceding and/or subsequent communications of that same thread.

Figure 2:
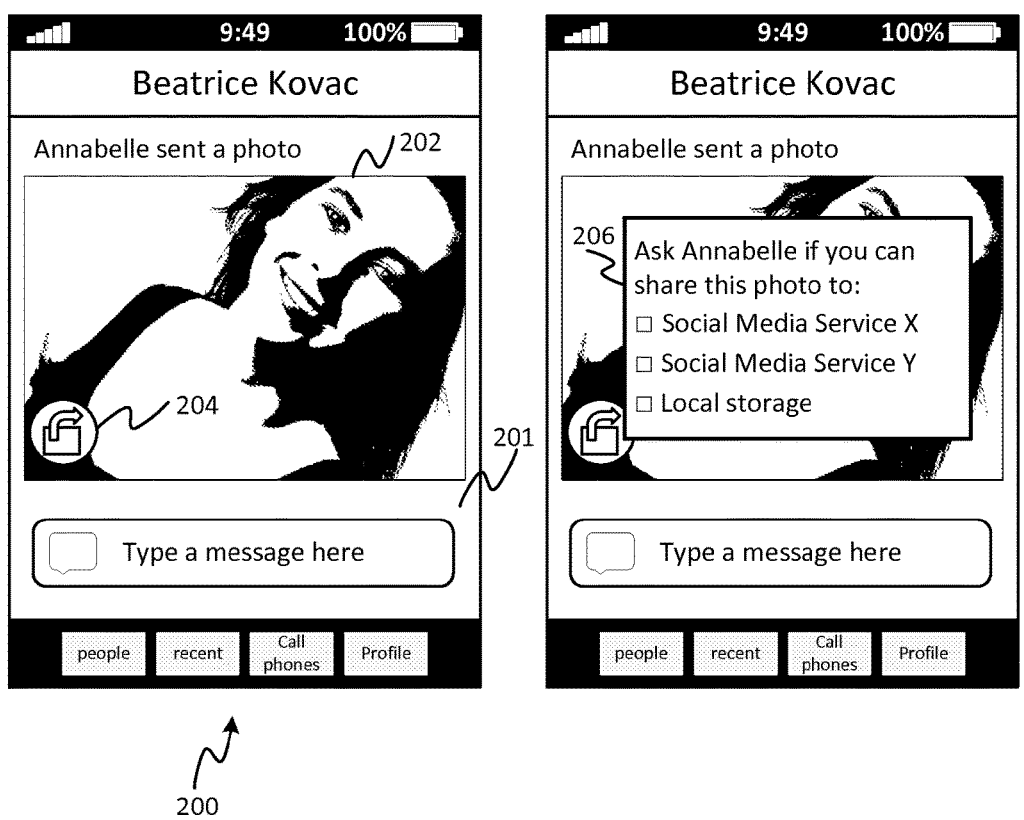
FIG. 2 is a schematic illustration of the user interface of a communication client application.

For example, referring to the left-hand illustration in FIG. 2, the instance of the client application 103 running on Beatrice's terminal 102 is displaying a user-interface 200 of the client 103 comprising a region 201 representing the conversation with Annabelle, e.g. a conversation window specific to that conversation. At some point, Annabelle shares a picture of herself (e.g. a "selfie") 202 via a corresponding user interface at Annabelle's end. The client 103 on Annabelle's terminal 102a sends the picture to the client 103 on Beatrice's terminal 102b as part of the conversation established between them (identified by the conversation ID of that conversation), and in response, the client 103 on Beatrice's terminal 102b presents the picture within the conversation user-interface region 201 (e.g. conversation window) of the client interface 200.

Note that a user can only become a participant of a conversation upon invitation from an existing participant. E.g. for the sake of illustration, consider that Annabelle invites only Beatrice to a picture messaging or IM conversation, but that further users such as Clive and Donald are not invited and hence are not able to participate in the conversation, i.e. do not receive communications sent as part of that conversation and cannot send communications as part of that conversation (unless later invited into the conversation). However it will be appreciated that the illustrated users are described only by way of example, and more generally any statements made herein in relation to Annabelle or her terminal 102a may apply to any source user sharing content into a conversation, and any statements made herein in relation to Beatrice or her terminal 102b may apply to any one or more other participants of a conversation receiving content shared by a source user within that private conversation. Similarly any statements made in relation to Clive or Donald or their terminals 102c, 102d may more generally apply to any users that are not participants of the conversation in question.

In embodiments, also connected to the network 101 is a server 104 running a serving application 105. This server 104 may be implemented as a single server unit, or more generally may be a logical server comprising one or more server units over one or more geographical sites. The serving application 105 takes the form of a computer program comprising code embodied on one or more computer-readable storage media (e.g. a magnetic medium such as a hard drive, an electronic medium such as EEPROM of "flash", or an optical medium such as a CDROM), and configured so as when executed on one or more processors of the server 104 to perform operations as discussed herein. In embodiments where a server 104 is involved, this (logical) server 104 also defines the communication service together with the client application 103—i.e. the communication service through which the conversation is conducted is that provided by the service provider operating the server 104 and providing the client application 103, being distinct from other communication services which are those provided by other providers from other (logical) servers.

The serving application 105 may have any one or more of a number of roles in the conversation. For instance, the invitation and acceptance messages involved when starting a conversation or adding a new user to a conversation may be sent between the client 103 on the inviting user's terminal 102a and the client 103 on the invited user's terminal 102b via the serving application 105 on the server 104, such that the server 104 mediates the establishment (set-up) of the conversation. The serving application 105 may also perform related functions such as authenticating users for joining conversations, and providing address look-up for determining the network address of the users' terminals 102 based on their usernames. And/or the actual content of the conversations may be transmitted between the clients 103 on the users' terminals 102 via the serving application 105 on the server 104. In this case the server 104 acts as a relay or host of the conversation, being an intermediary of the actual user communications (content) involved in the conversation.

Alternatively the instances of the communication client 103 could operate on a partially or wholly peer-to-peer (P2P) basis with little or no need for a server 104. Note therefore that "client" as used herein does not necessarily mean a client to a server, but may also cover a P2P client or more generally may refer to a client of any centralised and/or distributed communication infrastructure.

Turning now to the permissions model of the present disclosure, as mentioned, one consideration with existing communication services is that no restriction is placed on the use of the image at the receive side. On the other hand, it would be desirable if content was not completely sandboxed within a given conversation, so that users can still have the possibility of letting their shared content be used more widely if they so permit. To address this, a respective sharing permission model is added to each content item that is shared into a conversation, configured to act on the communication client application 103 to control the permissions for sharing or saving the respective content item outside the conversation (and in embodiments outside the communication service provided by the client application 103 and any associated server 104 through which the conversation was conducted).

In embodiments, the permission model is attached automatically to shared content whenever a user (the source user) shares a content item into a conversation (e.g. whenever he or she shares a picture, video clip or audio clip). Depending on implementation, the adding of the permissions model to the content item may be performed by the client application 103 on the source user's terminal 102a, or by the serving application 105 on the server 104.

The permissions model is a data structure that is electronically attached to the shared content item. It may specify sharing permissions on a per "sharee" user basis (per user with whom the content item is initially shared within the conversation), i.e. it provides the ability to specify permissions individually for different participants of the conversation in question. Alternatively or additionally, the permission model may specify the sharing permissions on a per third-party user basis (per user outside the conversation), i.e. it provides the ability to individually specify which non-participating users the content item can be shared with. Alternatively or additionally, the permission model may specify the permissions on a per third-party service basis (i.e. per communication service other than that provided by the communication client 103 through which the conversation is conducted). E.g. it could specify which of a plurality of social media sites the content is permitted to be shared to. In some embodiments the permission model could even specify different third party users and/or services for different participants of the conversation, i.e. individually specifying which third party users and/or services each of the participants is permitted to share the item with. Other alternative or additional permissions that may be specified by the permissions model, include whether the content item is allowed to be shared with one or more other conversations conducted through the same communication client 103 as the conversation in which the item was originally shared (i.e. into other conversations within the same communication service), and/or whether the receiving participant is permitted to save the content item to local storage on his or her own user terminal 102b (i.e. as a file that can be used outside the client 103 through which the conversation was conducted, e.g. to be accessed via a file system).

E.g. imagine by way of example that Annabelle invites another six users to join the conversation with Beatrice: Eustace, Fergus, Graham, Horace, Ignatius and Katy. Assume these users have usernames: BeatriceK123, Eustace456, Fergus789, GordonABC, HoraceXYZ, Ignatius1982, and Kathy1979 respectively, and that Clive and Donald have usernames Clive99 and Donald1000 respectively (these being the usernames that identify the users within the communication service provided by the client 103 and any associated server 104). The permissions model may comprise a table specifying a respective permission for each of the participants by mapping permissions to usernames (or other suitable identifiers), i.e. the permission model has a "slot" for specifying the permission granted to each of the other users. For instance:

| Sharee ID | Permissions |
| --- | --- |
| BeatriceK123 | Share onwards to Social Media site X |
| Eustace456 | Save to local storage |
| Fergus789 | Share onwards with other conversations |
| GordonABC | Share onwards only with Clive99 |
| HoraceXYZ | Share onwards with anyone except Donald1000 |
| Ignatius1982 | Share onwards with anyone |
| Katy1979 | [no permission] |

The client application 103 and/or serving application 105 is/are configured to respect the permissions specified by the permissions model. A conversation conducted through the communication service provided by the client application 103 and any associated server 104, cannot be shared out to other services or destinations (such as social media sites) without conforming to the permissions for that content item. Thus the person adding the content to the conversation chat is made the "owner" and has control over permissions to share his or her content out to other services or destinations as he or she wishes. Further, in embodiments the person sharing the content may, as the "owner", retain full rights by default so that they may take any action at any later time on any content which they have shared into the conversation.

When a content item is initially shared into a conversation by the source user (the "sharer"), in embodiments the permission model is automatically set by default (by the source user's client 103 or serving application 105) to block any sharing or other making available of the content item outside of the conversation (or at least is set to the most restricted level). To obtain a greater degree of permission, a participant who receives the item within the conversation (the "sharee") must request the desired permission from the source user. In other words, content inside the communication service provided by the client 103 and any associated server 104 is "sandboxed" to remain within that service by default. Other participants in the conversation have to request permissions from the owner before they can copy the content out of the particular client application 103 and send it to another service or destination.

Figure 3:
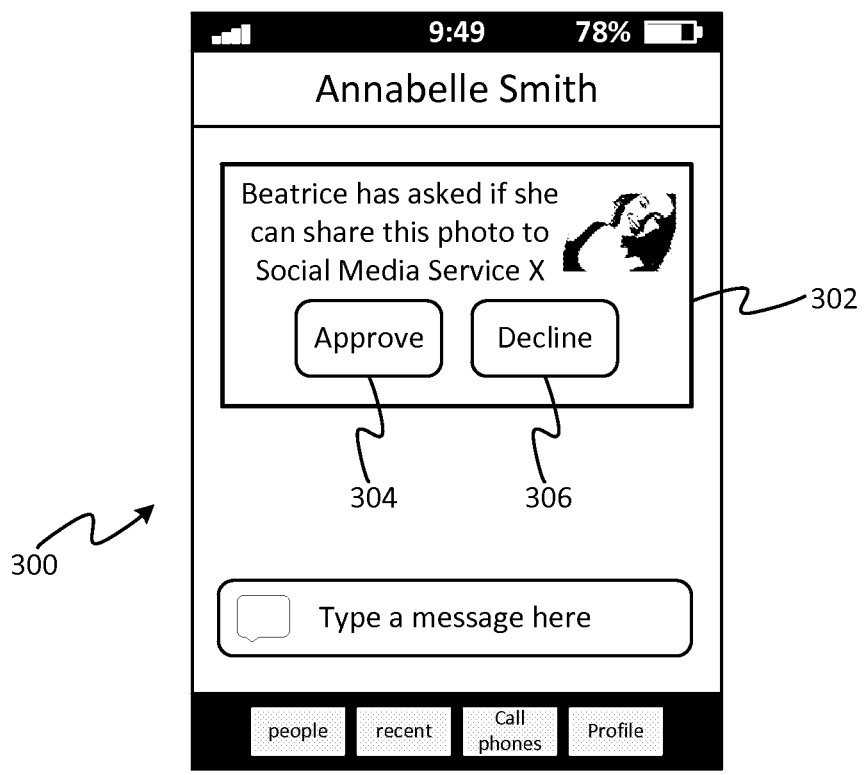
FIG. 3 is another schematic illustration of the user interface of a communication client application.

In embodiments, a permissions messaging mechanism is incorporated into the client application 103. Referring by way of example to FIGS. 2 and 3, the permission messaging mechanism includes a user interface element 204, 206 that is presented to the receiving participant of the conversation (the "sharee") as being attached to or at least in some way associated with the received content item, e.g. overlaid on or placed alongside a shared picture. For example this user interface element may comprise a button 204 which when activated (e.g. clicked or tapped) summons a drop-down menu 206, the menu 206 presenting the receiving participant (the "sharee") with a plurality of permissions which he or she may select to request from the source user (the "sharer").

The permission messaging mechanism also comprises a message type of the client application's messaging scheme, being an additional message type defined for requesting and granting (or denying) permissions in relation to content shared within a conversation. E.g. if the client application supports a set of message types such as IM, video call, voicemail, etc., then an additional permissions message type may be added to this set. When the requesting participant of the conversation (the "sharee") actuates the user interface element 204, 206 to request permission, the client 103 at the respective terminal 102b generates a request message of the permissions message type, which it sends over the network 101 to the client 103 on the source user's terminal 102a (in embodiments via the serving application 105 on the server 104, though not in all possible implementations). In response, at the source user's terminal 102a, the client 103 presents another user interface element 302, 304, 306 of the permissions messaging mechanism, allowing the source user to select whether to grant permission. For example this may comprise a box 302 or other such on-screen message comprising a pair of buttons 304, 206, presenting the source user with the option to either accept or decline the request respectively. N.B. the permissions requesting message and the permissions granting message could either appear in the same conversation as all the other messages, or could be exchanged one-on-one between the requester and the owner but still through the same communication application 103.

If the source user accepts, then in response, the client 103 on the source user's terminal 102a generates an acceptance message of the permissions message type which it returns over the network 101 to the client 103 on the requesting user's terminal 102b (in embodiments via the serving application 105 on the server 104, though not in all possible implementations). The client 103 on the requesting user's terminal 102b then grants the relevant permission in accordance with the acceptance message. If the request is declined on the other hand, the client 103 on the source user's terminal 102a could respond with an explicit decline message of the permissions message type, or alternatively could just not respond so that the permission is left ungranted by default.

Thus permission is requested by the requesting participant of the conversation (the "sharee") sending a message to the owner (the source user or "sharer") within the same context as the conversation and messaging scheme of the client application 103, rather than the requesting user having to ask the owner by some separate means such as asking vocally or in person, sending an email, etc.

An example interface realisation is shown in FIGS. 2 and 3. In this example, each content item has a share menu 204, 206 attached to it. In embodiments, the options on the share menu 206 vary by participant and their current permissions. For those with permissions to share the content out of the client application 103, the menu displays the destination options available to them (e.g. Social Media Service X, Social Media Service Y, save to disc, etc.). For those who do not yet have permission to share this content item out of the client 103, the menu becomes a way to construct a request message to the owner to request such permission. The menu displays the name of the owner and options for the desired destination: "Ask [owner of the content item] if this content can be shared to destination [Social Media Service X, Social Media Service Y, Save to disc]". A request message is created by selecting the desired destination and is automatically sent to the owner as a message of the messaging mechanism of the client application 103, e.g. by sending the message in a one-to-one chat with the owner.

In one example realization, permissions are granted by the owner to one person at a time for each content item as a response to a request from that person. In embodiments, even if the content was originally added to a group conversation, the request messages are one-to-one messages between the requester and the owner and approving the request is only for the one requesting individual.

The owner receives a request message which contains options to approve or decline: "[Requester's name] wants to share this content item [photo, video, etc] to destination [Social Media Service X, Social Media Service Y, Save to disc, etc]. Do you [Approve] or [Decline]. Send [option to add personal message]".

As an optional additional feature, permissions to share content from one conversation to another conversation conducted using the same communication service (that provided by the client application 103 and any associated server 104), could be required in the same way as permissions are required for sharing out from the client application 103 to a third-party destination such as a social media service.

Further, note that while the above embodiments enable the source user to grant permissions on an individual basis to individual requesting users and for different members of the conversation to have different permissions, it is not precluded that in embodiments the source user could be given the possibility of granting sharing permissions all members of the conversation group at once. In this case the system would use its knowledge of who the participants are in this unique conversation in order to enable each of the participants with the permissions.

As another optional feature, the source user's client 103 or serving application 105 may apply a watermark of the communication service in question, branding the content shared from that service into other services, so as to drive brand awareness.

As yet another optional feature, the messaging mechanism of the client 103 may support the option for the owner to revoke the permissions they have previously granted to another person for a particular item of content. In this case the messaging mechanism is used to send a message of the permissions message type from the client 103 on the source user's terminal 102a to the client 103 on the other's terminal 103b. This message acts on the client 103 at the other user's terminal 102b to set the permission model back to blocking the other user from making the content available outside of the conversation, or at least set the permission model back to a lesser degree of permission.

Furthermore, while the above has been described in terms of controlling permission to share and save content, in general the permission model may control permissions for other classes of actions that recipient users can take in relation to received content. For instance, other examples of such actions may include editing, remixing, and/or other forms of modification, or potentially any actions that are usually restricted by digital rights management (copying, printing, etc).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed in relation to a private conversation conducted over a network between a selected group of two or more participants, each of said group of users participating in the private conversation from a respective instance of a communication client executing on a respective user device, the method comprising:
   at the respective user device of a first participant in the private conversation, the respective instance of the communication client:
      receiving an item of content shared in the private conversation by a second participant, the item of content including a permissions model data structure, the permission model data structure describing permissions to use the respective content item outside of the private conversation to a plurality of sharing destinations;
      providing a user-interface share menu, configured to display options indicating potential sharing destinations for the item of content, the menu visually indicating that the permissions model data structure indicates that permission has not already been granted to share through a particular sharing destination;
      receiving a selection of the particular sharing destination for the item of content;
      responsive to receiving the selection of the particular sharing destination, automatically sending a permission request to share the item of content using the particular sharing destination to the second participant;
      receiving a permission grant from the second participant; and
      in response to receiving the permission grant, automatically sharing the item of content to the particular sharing destination.

2. The method of claim 1, comprising:
   sharing a second item of content with the second participant;
   receiving a request from the second participant requesting permission from the first participant to make the second item of content available outside of said private conversation; and
   on condition of the request being accepted by the first participant, modifying a second permission model data structure corresponding to the second item of content to indicate that permission has been granted.

3. The method of claim 1, wherein the permission model data structure is a default setting when the item of content is shared, the default setting being to block the first participant from making the item of content available outside of the private conversation, until the second participant grants the permission to do so.

4. The method of claim 1, wherein the respective instance of the communication client automatically attaches a permission model data structure to content items shared into the private conversation by the first participant.

5. The method of claim 1, wherein the permission model data structure controls the permissions individually for each of a plurality of the participants in the private conversation.

6. The method of claim 1, wherein the permissions controlled by the permission model data structure comprises: whether or not the item of content is permitted to be shared with one or more third-party users who are not participants in the private conversation, and/or which third-party users the respective content item is permitted to be shared with.

7. The method of claim 1, wherein the permission controlled by the permission model data structure comprises: one or more of: whether or not the item of content is permitted to be shared into one or more other conversations conducted using the respective instance of the communication client, or which other conversations the item of content is permitted to be shared with.

8. The method of claim 1, wherein the permission controlled by the permission model data structure comprises: whether or not the item of content is permitted to be saved to non-volatile storage.

9. The method of claim 1, wherein the permission controlled by the permission model data structure comprises one or more of: whether or not the item of content is permitted to be modified outside of the private conversation, or in what manner the item of content is permitted to be modified outside of the private conversation.

10. The method of claim 1, wherein:
    item of content comprises one or more of: an audio clip, still image and/or video image; and
    the private conversation comprises one of: an IM chat conversation, a VoIP conversation, a picture messaging conversation, a video messaging conversation, or a voice messaging conversation.

11. The method of claim 1, comprising inserting a watermark of the respective instance of the communication client into a second item of content shared over the private conversation.

12. The method of claim 2, comprising setting the respective permission model data structure to revoke the permission from the second participant.

13. The method of claim 1, wherein the method further comprises receiving the respective instance of the communication client at the respective user device.

14. The method of claim 1, wherein the permissions model data structure is configured to be modified based on message-based requests and approvals communicated through the private conversation.

15. The method of claim 1, wherein one of the plurality of sharing destinations include at least one social media service.

16. The method of claim 1, wherein providing the user-interface share menu comprises displaying a second particular option visually indicating that the permissions model data structure indicates that permission has already been granted to share through a second particular sharing destination.

17. The method of claim 16, further comprising wherein responsive to the first participant selecting the second particular sharing destination, automatically sharing the item of content through the second particular sharing destination.

18. A user device comprising:
a processor;
a memory communicatively coupled to the processor and storing instructions, which when executed by the processor of the user device that is used by a first participant in a private conversation conducted over a network between a selected group of two or more participants, causes the user device to perform operations comprising:
receiving an item of content shared in the private conversation by a second participant, the item of content including a permissions model data structure, the permission model data structure describing permissions to use the respective content item outside of the private conversation over a respective plurality of sharing destinations;
providing a user-interface share menu, configured to display options indicating potential sharing destinations for the item of content, the menu visually indicating that the permissions model data structure indicates that permission has not already been granted to share to a particular sharing destination;
receiving a selection of the particular sharing destination for the item of content;
responsive to receiving the selection of the particular sharing destination, automatically sending a permission request to share the item of content using the particular sharing destination to the second participant;
receiving a permission grant from the second participant; and
in response to receiving the permission grant, automatically sharing the item of content to the particular sharing destination.

19. A storage device, including instructions, which when executed by a user device of a first participant in a private conversation conducted over a network between a selected group of two or more participants, causes the user device to perform operations comprising:
receiving an item of content shared in the private conversation by a second participant, the item of content including a permissions model data structure, the permission model data structure describing permissions to use the respective content item outside of the private conversation to a respective plurality of sharing destinations;
providing a user-interface share menu, configured to display options indicating potential sharing destinations for the item of content, the menu visually indicating that the permissions model data structure indicates that permission has not already been granted to share through a particular sharing destination;
receiving a selection of the particular sharing destination for the item of content;
responsive to receiving the selection of the particular sharing destination, automatically sending a permission request to share the item of content using the particular sharing destination to the second participant;
receiving a permission grant from the second participant; and
in response to receiving the permission grant, automatically sharing the item of content to the particular sharing destination.

* * * * *